(Model.)
H. H. HAYES.
Nursing Bottle Fitting.
No. 236,583.                              Patented Jan. 11, 1881.
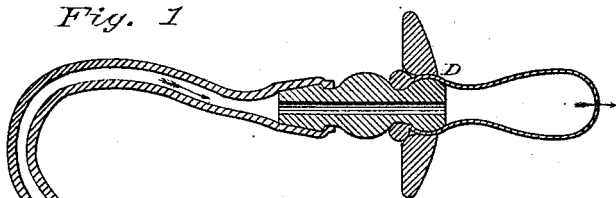
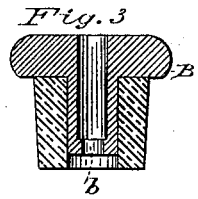
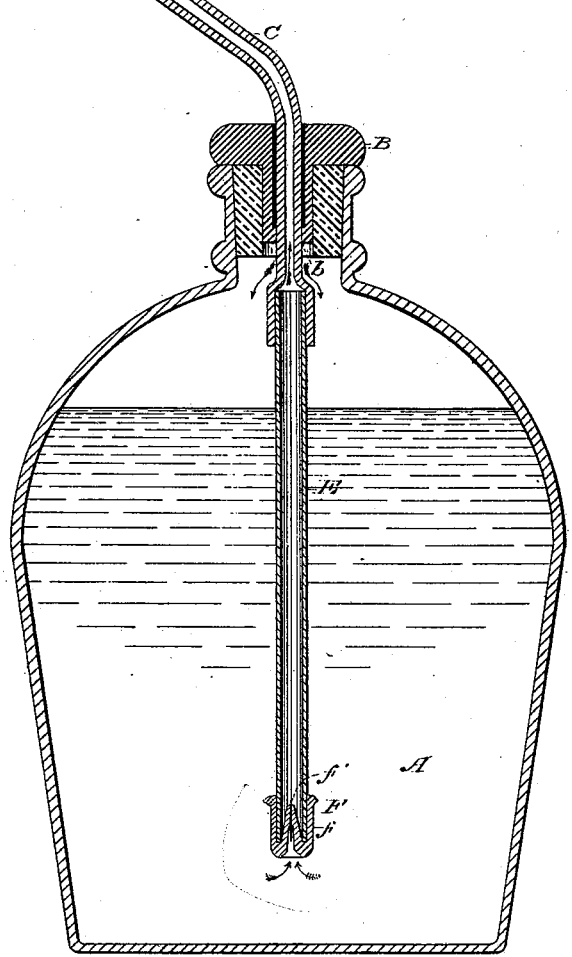
Witnesses
C. J. Hedrick
Philip Mauro
Inventor
Henry H. Hayes
by A. Pollok
his atty.

UNITED STATES PATENT OFFICE.

HENRY H. HAYES, OF NEW YORK, N. Y., ASSIGNOR TO GOODYEAR RUBBER COMPANY, OF SAME PLACE.

NURSING-BOTTLE FITTING.

SPECIFICATION forming part of Letters Patent No. 236,583, dated January 11, 1881.

Application filed May 21, 1880. (Model.)

*To all whom it may concern:*

Be it known that I, HENRY H. HAYES, of No. 98 East Seventh street, New York city, New York State, have invented a new and useful Improvement in Nursing-Bottle Fittings, which improvement is fully set forth in the following specification.

Fittings for nursing-bottles consist, generally, of a tube of glass or other suitable material connected with a shield and a nipple by a flexible tube extending through the stopper of the nursing-bottle, the latter containing milk or other fluid to be supplied to the infant.

The present invention has particular reference to the valve at the end of the glass or other tube which prevents the liquid from flowing back out of the tube, and to the fitting as a whole.

The valve in this invention is made of rubber or other suitable material, and is adapted to be placed upon the end of an ordinary tube. It consists of a small cylinder, with a tongue or inverted cone projecting upward from the bottom of the cylinder, and split or cut so as to open and close to permit the passage of the liquid in one direction and prevent its return in the other. The valve is superior to the valves heretofore made in the matter of cleanliness. A brush may be passed through the valve for cleaning it, without injury to the latter in any part whatever, and it cannot be put out of order by any ordinary usage. The cleaning can be immediately and thoroughly effected in this way, or it can be simply rolled between the thumb and finger in water; also, the shape of the valve gives it perfect freedom of action in practical use, inasmuch as, when the infant nurses, the pressure of the milk or other fluid against the wider or bottom portion of the cone part of the valve must naturally open it to admit the milk or other fluid from the bottle; but the slightest pressure backward must naturally, from the shape of it, close the small part of the cone, thereby retaining the milk or other fluid in the tube, making it much easier for the infant to nurse.

The fitting, as a whole, which constitutes a part of this invention is composed of the nipple, flexible tube, and rigid tube, and the valve at the bottom of the rigid tube, in combination with a stopper having a single hole for the passage of the flexible tube, which is contracted for a short distance to fit the tube, but is enlarged throughout the rest of its length, so as to give free access to the air on either side. This stopper allows the air to enter the bottle as fast as the milk or other fluid is withdrawn through it, but not so as to allow the milk or other fluid to leak through or around it, and as it can be readily cleaned, having no separate small air or vent holes, it makes, in combination with the rubber valve and tubes, a perfect nursing-bottle fitting.

The construction of the stopper *per se*, and the combination of the same with a flexible tube, form the subject of another application for Letters Patent, and therefore are not included in the present invention, which is limited to the construction of the lower valve and the improved fitting as a whole.

Referring to the accompanying drawings, which form a part of this specification, Figure 1 shows, in section, a bottle provided with fittings made in accordance with this invention; Fig. 2, the valve detached, and Fig. 3 the stopper.

The bottle A may be of any ordinary or suitable construction. The stopper B is formed of wood or other suitable material surrounded with cork or rubber to insure a tight joint with the neck of the bottle; but it can be made in other ways, if desired. The hole in said stopper is provided at the bottom with a contracted portion, $b$. This contracted portion may be about one-sixteenth of an inch in length, and in diameter corresponds with the size of the flexible tubing used. Ordinarily it would be about three-sixteenths of an inch. The upper part of the hole is in diameter about one-sixteenth of an inch larger than the contracted portion. These dimensions may, it is obvious, be varied within considerable limits. Good results are accomplished with those given. The flexible tube C is connected at one end with the nipple and shield D, and at the other with the glass tube E, on the lower end of which the valve F is placed. This valve is composed of the cylinder $f$ and an interior tongue or inverted cone, $f'$, which is cut or slit, as shown. The cylinder and cone or tongue are formed integral by vulcanizing in a mold, and the slit is afterward made.

The fitting is put together by connecting the nipple and shield D with the flexible tube C in the manner shown, or in any other suitable way, and said tube is then passed through the hole in stopper B, filling the contracted portion b of said hole. One end of the tube E, which may be of other material as well as of glass, is inserted into the end of the flexible tube, and the valve F is slipped on the other end of tube E, the cone or tongue f' entering the bore thereof and the cylinder f fitting tightly around it.

The bottle being filled, or partly filled, with milk or other fluid, and the stopper being inserted, with the tube E and valve F inside the bottle, the milk is drawn off by the action of the nipple from the bottle through valve, glass tube, and rubber tube. The drawing of the milk through the tubing creates a vacuum in the bottle, which draws in the air through the wider portion of stopper, and also through the narrow part b, the resistance there being very slight. The air rushing in fills the vacancy caused by the drawing off of the milk or other fluid. The valve only allows the milk to be drawn one way, and the tube from the nipple to the valve is consequently always full of milk, and stays full from the commencement of the infant's nursing, thereby making it impossible for the infant to draw any air into its stomach through the tube while there is any milk or other fluid remaining in the bottle.

I would observe, in conclusion, that I do not claim herein the stopper of the construction shown and described, nor the combination thereof with the flexible or elastic tube, since these form, as before stated, the subject of a separate application for Letters Patent; but What I do claim, and desire to secure by Letters Patent, is—

1. A valve composed of a cylinder of rubber or other suitable material, with a tongue or cone inclosed therein and split to form the valve-opening, substantially as described.

2. The combination, in a valve for nursing-bottle fittings or other purpose, with a small rubber cylinder, of a hollow cone projecting upwardly from the bottom of said cylinder and slit lengthwise in the center, substantially as described.

3. The combination of the nipple, flexible tube, and rigid tube with the stopper having a single hole for the passage of said flexible tube, contracted for a short distance to fit the same, and the valve attached to the lower end of said rigid tube, the whole being adapted to operate in connection with a bottle, substantially as described.

In testimony whereof I have signed this specification in the presence of two subscribing witnesses.

HENRY H. HAYES.

Witnesses:
   THEO. E. SHURNE,
   CHAS. A. TALLMAN.